United States Patent
Yamada et al.

(10) Patent No.: US 6,592,337 B2
(45) Date of Patent: Jul. 15, 2003

(54) SHAFT SEAL OF A LIP TYPE WITH FLUID GUIDING COMPONENTS HAVING THE SAME

(75) Inventors: Takeshi Yamada, Kariya (JP); Takayuki Imai, Kariya (JP); Naoya Yokomachi, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 0 days.

(21) Appl. No.: 09/997,116

(22) Filed: Nov. 28, 2001

(65) Prior Publication Data

US 2002/0081212 A1 Jun. 27, 2002

(30) Foreign Application Priority Data

Nov. 29, 2000 (JP) ........................... 2000-363039
Nov. 27, 2001 (JP) ........................... 2001-360393

(51) Int. Cl.$^7$ ................................ F04B 1/26
(52) U.S. Cl. ............... 417/222.2; 417/269; 277/549; 277/559; 277/560
(58) Field of Search ............... 417/222.2, 269; 277/549, 559, 560

(56) References Cited

U.S. PATENT DOCUMENTS 6,123,514 A * 9/2000 Kawaguchi et al. ..... 417/222.2

2002/0003336 A1 * 1/2002 Yamada et al. ............ 277/559

FOREIGN PATENT DOCUMENTS

| EP | 0 945 653 A1 | 9/1999 |
| JP | 05-149442 | 6/1993 |
| JP | 06-300142 | 10/1994 |
| JP | 10-252897 | 9/1998 |

* cited by examiner

Primary Examiner—Charles G. Freay
Assistant Examiner—Emmanuel Sayoc
(74) Attorney, Agent, or Firm—Knoble & Yoshida, LLC

(57) ABSTRACT

A shaft seal seals a rotary shaft surface to prevent fluid from moving between a high-pressure area and a low-pressure area. The shaft seal has a lip type ring fitted on the side of the high-pressure area of the rotary shaft. The lip type ring further includes a lip ring, a plurality of first portions and a plurality of second portions. The lip ring is located around the rotary shaft. The lip ring has a ring surface. The first portions are formed on the ring surface to slidably contact the rotary shaft surface. The first portions guide the fluid towards a space between the ring surface and the rotary shaft surface as the rotary shaft is rotated. The second portions are formed on the ring surface. The second portions prevent the fluid in the space from leaking into the low-pressure area.

23 Claims, 8 Drawing Sheets

Fig. 5(a)
Fig. 5(b)
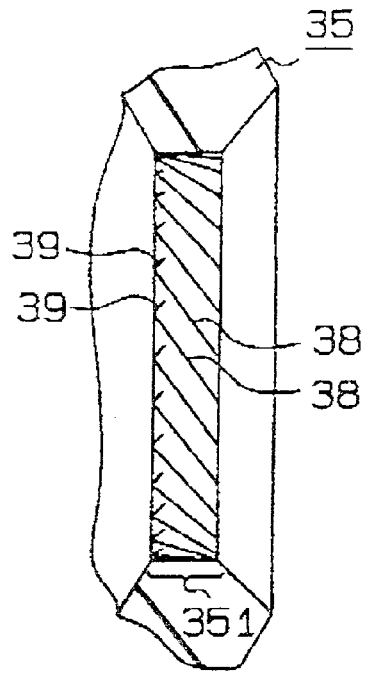 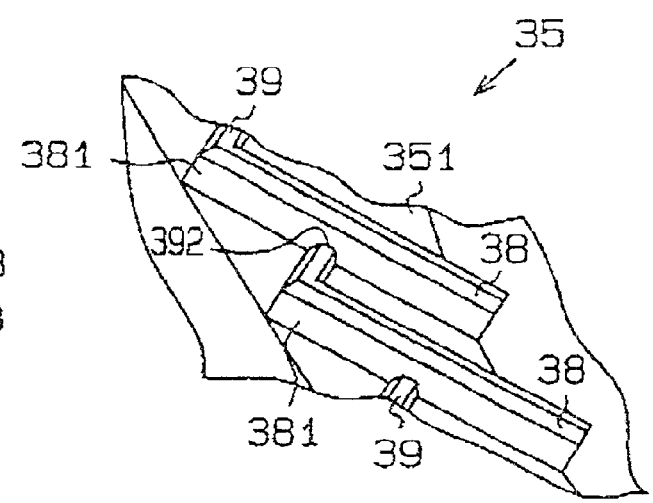
Fig. 6(a)
Fig. 6(b)
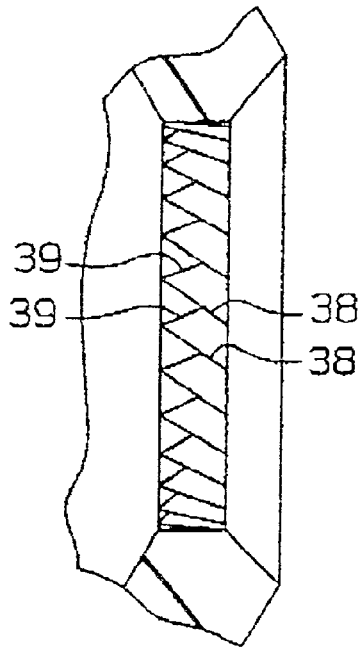 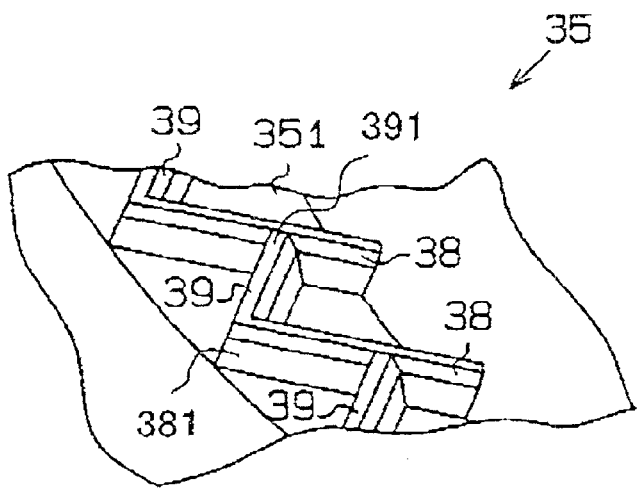

SHAFT SEAL OF A LIP TYPE WITH FLUID GUIDING COMPONENTS HAVING THE SAME

BACKGROUND OF THE INVENTION

1. Field of the Invention

The present invention relates to a compressor, more particularly, to a shaft seal for the compressor.

2. Relevant Prior Art

The shaft seal has a first lip ring and a second lip ring along a rotary shaft to separate a high-pressure area from a low-pressure area. The first lip ring and the second lip ring contact a circumferential surface of the rotary shaft to prevent fluid from leaking along the circumferential surface of the rotary shaft from the high-pressure area towards the low-pressure area.

Unexamined Japanese Patent Publications No. 5-149442 and No. 6-300142 disclose a shaft seal with a pair of seal elements that is referred to as a pair of lip rings to prevent fluid from leaking along the circumferential surface of the rotary shaft. The shaft seal is, for example, applied to seal a rotary shaft surface of a compressor which constitutes a refrigerant circuit. In Unexamined Japanese Patent Publication No. 5-149442, the seal elements have concentric circular grooves on a side of the high-pressure area and spiral grooves on a side of the low-pressure area. In Unexamined Japanese Patent Publication No. 6-300142, the seal elements have spiral grooves on a side of the low-pressure area. These spiral grooves each function as a pump which returns fluid from an area between a sliding contact portion of the seal element and a rotary shaft surface to where the fluid originally traveled from.

The compressor has sliding contact portions which require lubrication. To lubricate the sliding contact portions, lubricating oil which flows as well as refrigerant is essential. The lubricating oil is used for lubricating a sliding contact portion of the seal element for a rotary shaft. However, the concentric circular grooves which are disclosed in Unexamined Japanese Patent Publication No. 5-149442 do not draw enough lubricating oil. Therefore, the concentric circular grooves are not effective to satisfactorily lubricate a sliding contact portion of the seal element for a rotary shaft. In addition, since a seal between a rotary shaft and a seal element has to be created only by surface pressure acting therebetween, the surface pressure has to be increased. Because of the increased pressure, the seal element is rapidly worn.

On the other hands the seal element on a side of the high-pressure area disclosed in Unexamined Japanese Patent Publication No. 6-300142 does not have the concentric circular groove. Fluid on the side of the high-pressure area tends to move into a space between a pair of seal elements. The movement of the fluid increases pressure of the fluid in the space. That deforms the seal element made of resin on the side of the low-pressure area. For the above reasons, the sliding contact portion of the seal element is rapidly worn. Therefore, the life of the shaft seal is shortened.

SUMMARY OF THE INVENTION

The present invention addresses a shaft seal with long life for improving reliability.

To achieve the above object, the present invention has following features. A shaft seal seals a rotary shaft surface to prevent fluid from moving between a high-pressure area and a low-pressure area. The rotary shaft has a rotary axis and extends between the high-pressure area and the low-pressure area. The shaft seal has a first lip type ring and a second lip type ring. The first lip type ring is fitted on the side of the high-pressure area of the rotary shaft. The first lip type ring further includes a lip ring, a plurality of first portions and a plurality of second portions. The lip ring is located around the rotary shaft. The lip ring has a ring surface. The first portions are formed on the ring surface to slidably contact the rotary shaft surface and are placed at a first predetermined angle with respect to the rotary axis. The first portions guide the fluid towards a space between the ring surface and the rotary shaft surface as the rotary shaft is rotated. The second portions are formed on the ring surface at a second predetermined angle with respect to the rotary axis. The second portions prevent the fluid in the space from leaking into the low-pressure area. The second lip type ring is fitted on the side of the low-pressure area of the rotary shaft so that leakage of the fluid along the rotary shaft surface is prevented.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

FIG. 1(a) is a partial enlarged view of FIG. 1 illustrating the first preferred embodiment of the shaft seal according to the present invention;

FIG. 5(a) is a partial enlarged cross-sectional side view illustrating a third embodiment of the shaft seal according to the present invention;

FIG. 5(b) is a partial enlarged perspective view illustrating the third preferred embodiment of the shaft seal according to the present invention;

FIG. 6(a) is a partial enlarged cross-sectional side view illustrating a fourth embodiment of the shaft seal according to the present invention;

FIG. 6(b) is a partial enlarged perspective view illustrating the fourth preferred embodiment of the shaft seal according to the present invention;

DETAILED DESCRIPTION OF THE PREFERRED EMBODIMENTS

A first preferred embodiment of the present invention will be described with reference to FIGS. 1 through 3. The present invention is applied to a variable displacement compressor. In the first preferred embodiment, carbon dioxide is used as refrigerant.

Figure 1:
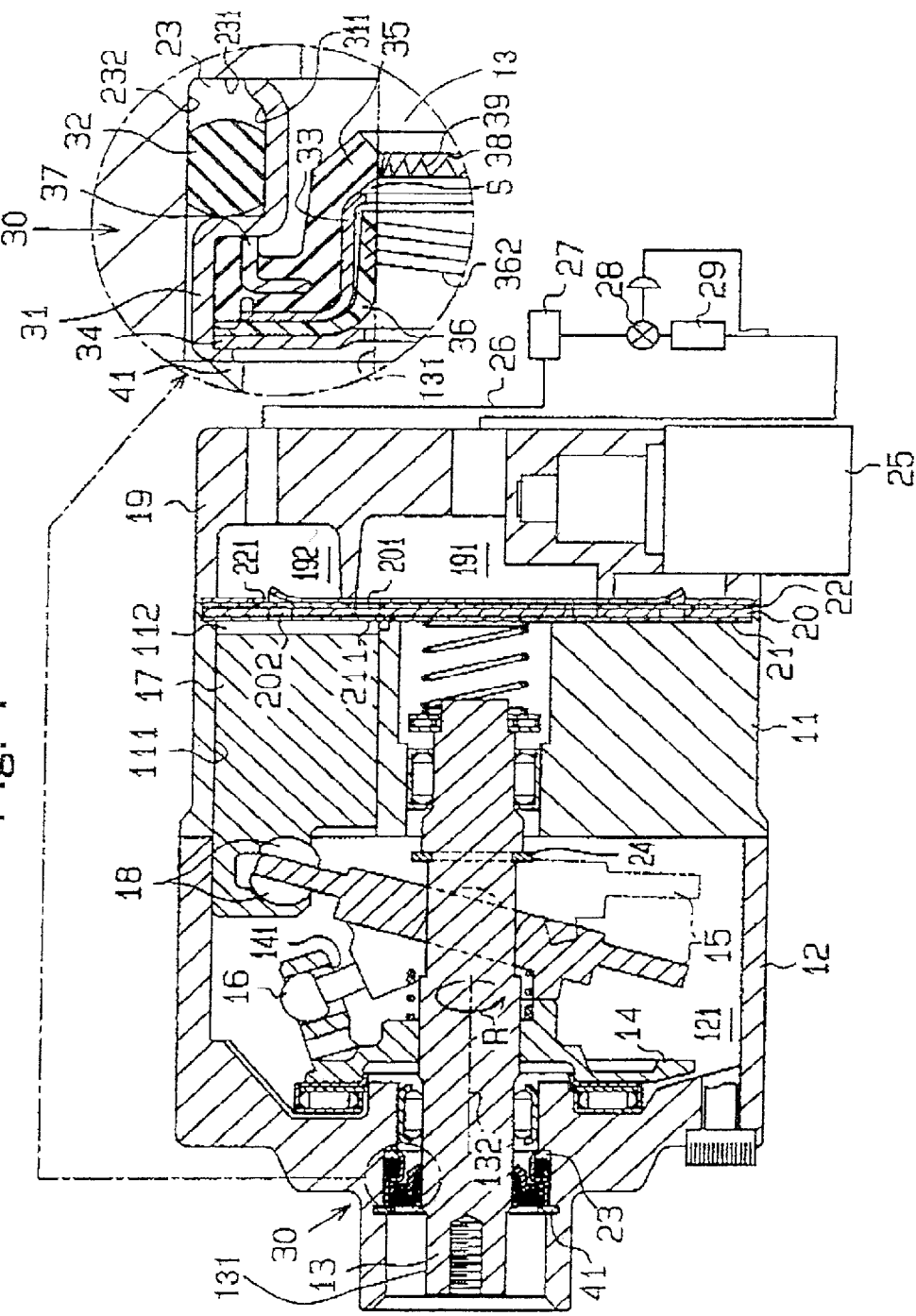
FIG. 1 is a diagram in a cross-sectional view illustrating a compressor with a first preferred embodiment of a shaft seal according to the present invention.

As shown in FIG. 1, a cylinder block 11 and a front housing 12 define a crank chamber 121. A drive shaft 13 is supported by the cylinder block 11 and by the front housing 12. The drive shaft 13 is rotated by an external drive source such as a vehicle engine. A rotary support member 14 is mounted on the drive shaft 13. A swash plate 15 is supported by the drive shaft 13 to be slidable in an axial direction of the drive shaft 13. The swash plate 15 is supported by the drive shaft 13 to be inclinable with respect to the axis of the drive shaft 13. A pair of guide pins 16 is mounted on the swash plate 15. The guide pins 16 are slidably inserted in a guide hole 141 formed on the rotary support member 14. The swash plate 15 is inclinable with respect to the axis of the drive shaft 13 by the guide hole 141 and the guide pin 16. The swash plate 15 is rotated integrally with the drive shaft 13. The swash plate 15 is inclinably and movably guided by a slide of the guide pin 16 in the guide hole 141 and by a support of the drive shaft 13.

Still referring to FIG. 1, an inclination angle of the swash plate 15 is adjusted by controlling pressure in the crank chamber 121. As the pressure in the crank chamber 121 increases, the inclination angle of the swash plate 15 is decreased. On the other hand, as the pressure in the crank chamber 121 decreases, the inclination angle of the swash plate 15 is increased. Refrigerant in the crank chamber 121 flows into a suction chamber 191 defined in a rear housing 19 through a bleed passage which is not illustrated. Refrigerant in the discharge chamber 192 defined in the rear housing 19 flows into the crank chamber 121 through a supply passage which is not illustrated. A capacity control valve 25 is placed in the supply passage. The capacity-control valve 25 controls an amount of refrigerant supplied into the crank chamber 121 from the discharge chamber 192. As the amount of refrigerant supplied into the crank chamber 121 from the discharge chamber 192 increases, the pressure in the crank chamber 121 is increased. On the other hand, as the amount of refrigerant supplied into the crank chamber 121 from the discharge chamber 192 decreases, the pressure in the crank chamber 121 is decreased. That is, the inclination angle of the swash plate 15 is controlled by the capacity control valve 25.

An abutment between the swash plate 15 and the rotary support member 14 regulates a maximum inclination angle of the swash plate 15. An abutment between a circular clip 24 assembled on the drive shaft 13 and the swash plate 15 regulates a minimum inclination angle of the swash plate 15.

A plurality of cylinder bores 111 is formed in the cylinder block 11 to surround the drive shaft 13, although a single cylinder bore is illustrated in FIG. 1. A piston 17 is accommodated in each of the cylinder bores 111. The piston 17 defines a compression chamber 112 in the cylinder bore 111. A rotational movement of the swash plate 15 which is integrally rotated with the drive shaft 13 is converted to a reciprocating movement of the piston 17 through a pair of shoes 18. That is, the piston 17 moves reciprocally in the cylinder bore 111.

Refrigerant in the suction chamber 191 which is a suction pressure area is drawn into the compression chamber 112 during a reciprocating movement of the piston 17 from a right side to a left side in FIG. 1. At this time, the refrigerant pushes away a suction valve 211 formed on a suction valve plate 21 and flows from a suction port 201 formed on a valve plate 20 into the compression chamber 112. Refrigerant drawn into the compression chamber 112 is discharged into the discharge chamber 192 which is a discharge pressure area during the reciprocating movement of the piston 17 from the left side to the right side in FIG. 1. At this time, the refrigerant pushes away a discharge valve 221 formed on a discharge valve plate 22 and flows from a discharge port 202 formed on the valve plate 20 into the discharge chamber 192.

The discharge chamber 192 and the suction chamber 191 are connected with each other through the external refrigerant circuit 26. Once refrigerant is discharged from the discharge chamber 192 to the external refrigerant circuit 26, the refrigerant returns to the suction chamber 191 through a condenser 27, an expansion valve 28 and an evaporator 29 Sliding portions in the compressor are lubricated by lubricating oil that circulates with refrigerant in the external refrigerant circuit 26.

A seal chamber 23 is formed between a circumferential surface 131 of the drive shaft 13 and the front housing 12. A lip seal 30 functioning as a shaft seal is accommodated in the seal chamber 23.

As shown in FIG. 1(a), a lip seal 30 includes a ring case 31, an O-ring 32 made of rubber, a pair of ring-shaped metal retainers 33 and 34, a lip ring 35 made of rubber, a lip ring 36 made of resin and a ring-shaped metal retainer 37. The O-ring 32 is fitted on an annular recess 311 on an outer circumferential side of the ring case 31. The ring-shaped metal retainers 33 and 34 are placed on an inner circumferential side of the ring case 31. The ring-shaped metal retainer 33 retains the lip ring 35. The ring-shaped metal retainer 34 retains the lip ring 36. The ring-shaped metal retainer 37 retains the lip ring 35. The lip ring 36 is made of resin including fluoro series resin such as polytetrafluoroethylene. An inner wall 231 of the seal chamber 23 and a circular clip 41 assembled on a cylindrical surface 232 of the seal chamber 23 regulate the ring case 31. The O-ring 32 is secured to the annular recess 311 on the outer circumferential side of the ring case 31 and to the cylindrical surface 232 of the seal chamber 23. The lip ring 36 made of resin is placed between the pair of the ring-shaped metal retainers 33 and 34. The ring-shaped metal retainer 33 is placed between the lip ring 35 made of rubber and the lip ring 36 made of resin.

Figure 2:
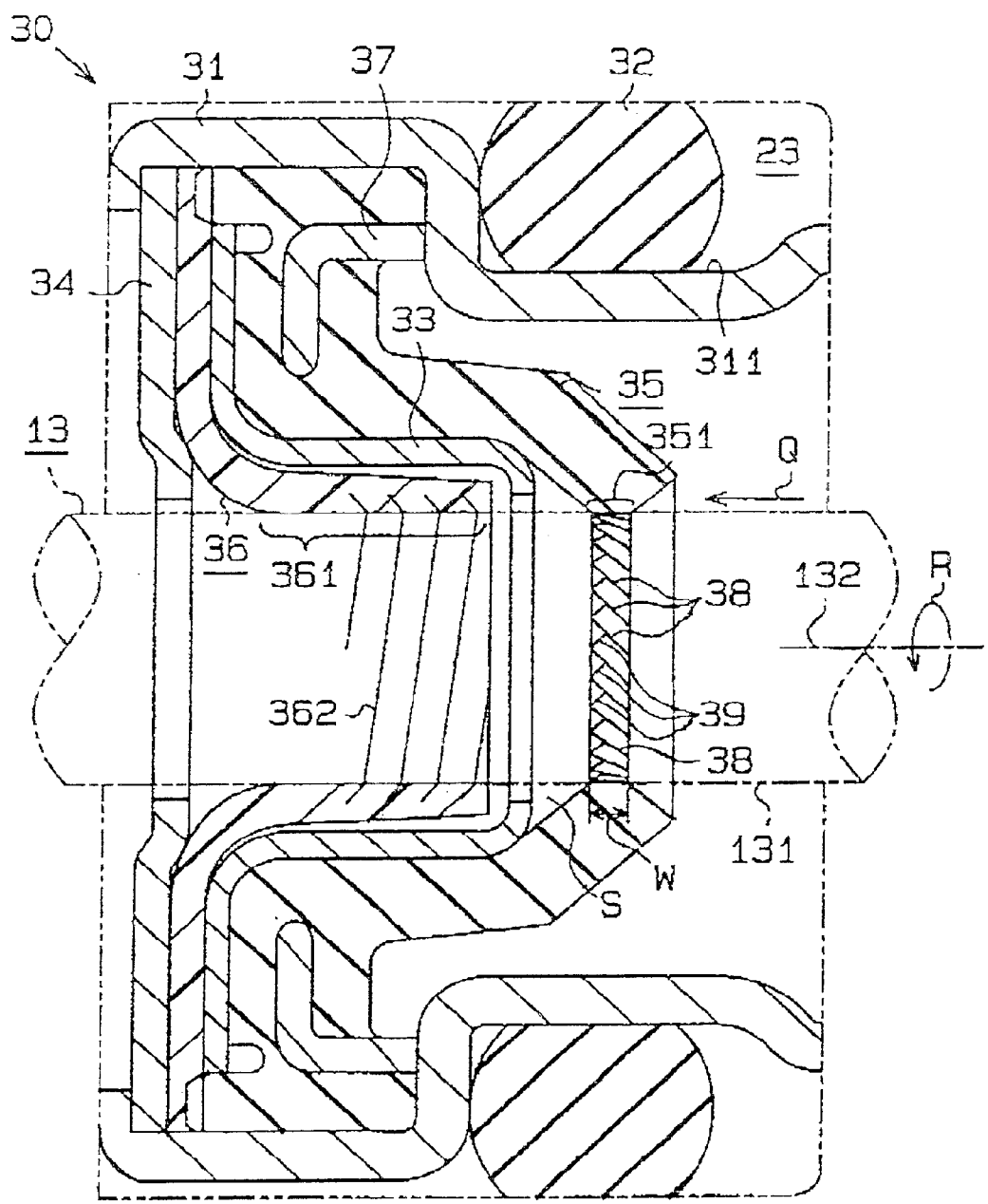
FIG. 2 is a partial enlarged cross-sectional side view illustrating the first preferred embodiment of the shaft seal according to the present invention.

As shown in FIG. 2, a sliding contact portion 351 in the shape of a circumferential surface, which functions as a ring surface, is formed on the lip ring 35 made of rubber A plurality of first protrusions 38 and a plurality of second protrusions 39 are formed on the sliding contact portion 351. The first protrusion 38 guides lubricating oil. The second protrusion 39 prevents the lubricating oil from leaking. Each of the first protrusions 38 is not an annular ring. Each of the second protrusions 39 is not an annular ring, either. Each of the first protrusions 38 and the second protrusions 39 are arranged about an axis of the lip ring 35 made of rubber or an axis 132 of the drive shaft 13 in rows. Thus, the first protrusions 38 and the second protrusions 39 cooperatively form an annular ring about the axis 132 of the drive shaft 13. While the drive shaft 13 is rotated in a direction of an arrow R, the refrigerant containing the lubricating oil in the crank chamber 121 tends to move in a direction of an arrow Q along the circumferential surface 131 of the drive shaft 13. The first protrusions 38 are inclined with respect to the direction of the arrow R of the drive shaft 13 so that the refrigerant and the lubricating oil travel in a direction of the arrow Q along the circumferential surface 131 of the drive shaft 13. The second protrusions 39 are inclined with respect to the direction of the arrow R of the drive shaft 13 so that the refrigerant and the lubricating oil travel in an opposite direction to the arrow Q along the circumferential surface 131 of the drive shaft 13.

Still referring to FIG. 2, each of the first protrusions 38 and the second protrusions 39 is placed in a circumferential direction of the sliding contact portion 351 one after the other. That is, a single second protrusion 39 is placed between a pair of the first protrusions 38 which are next to each other while a single first protrusion 38 is placed between a pair of the second protrusions 39 which are next to each other.

Figure 3:
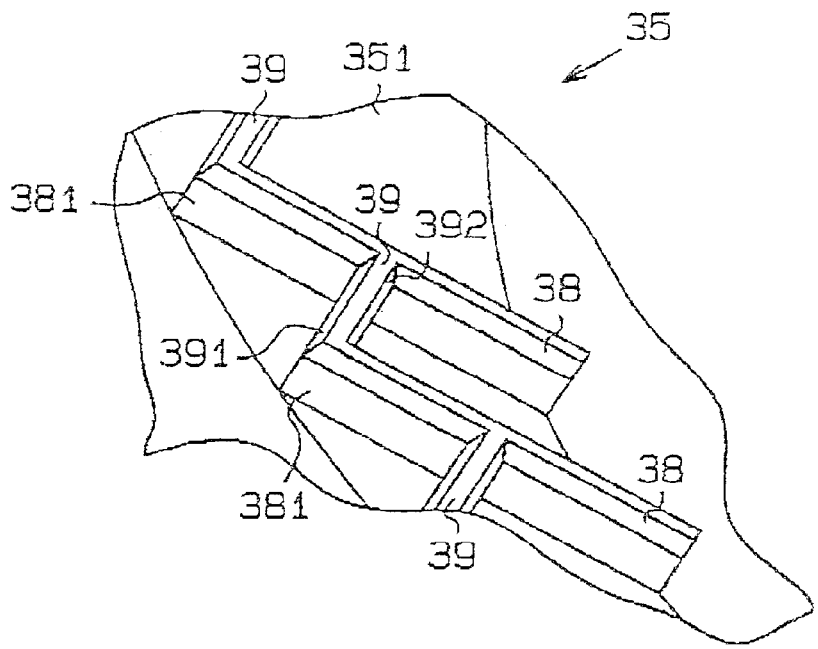
FIG. 3 is a partial enlarged perspective view illustrating the first preferred embodiment of the shaft seal according to the present invention.

As shown in FIG. 3, a low-pressure side end 391 of the second protrusion 39 is connected to a low-pressure side end 381 of the first protrusion 38 which is next to the second protrusion 39. A high-pressure side end 392 of the second protrusion 39 is connected substantially halfway to another first protrusion 38 which is next to the second protrusion 39. The low-pressure side end 381 of the first protrusion 38 and the low-pressure side end 391 of the second protrusion 39 are at nearly a right angle with each other. The first protrusions 38 and the second protrusions 39 have equal height Referring back to FIG. 2, a spiral groove 362 is formed on a sliding contact portion 361 of the lip ring 36 made of resin. There, fluid such as refrigerant or lubricating oil is defined by the circumferential surface 131 and by the sliding contact portion 361 of the drive shaft 13. The spiral groove 362 functions as a pump which returns the fluid into a space S between the lip ring 35 made of rubber and the lip ring 36 made of resin when the spiral groove 362 is rotated relative to the drive shaft 13.

In the first embodiment, the following effects are obtained.

(1) The refrigerant in the crank chamber 121 circulates with the lubricating oil. The refrigerant and the lubricating oil tend to move out of a compressor through a clearance between the circumferential surface 131 of the drive shaft 13 and the sliding contact portion 351 of the lip ring 35 made of rubber. The first protrusion 38 slides on the circumferential surface 131 of the drive shaft 13 towards an opposite direction to the arrow R. At this time, the first protrusion 38 guides the lubricating oil through a space between the sliding contact portion 351 of the lip ring 35 and the circumferential surface 131 of the drive shaft 13. The lubricating oil guided through the space between the sliding contact portion 351 and the circumferential surface 131 arrives in the vicinity of the low-pressure side end 381 of the first protrusion 38. Thus, a contact surface between the sliding contact portion 351 and the circumferential surface 131 is satisfactorily lubricated by the lubricating oil. Such lubrication prevents the sliding contact portion 351 of the lip ring 35 made of rubber from being worn while the refrigerant in the crank chamber 121 presses the sliding contact portion 351 of the lip ring 35 made of rubber against the circumferential surface 131 of the drive shaft 13.

On the other hand, the second protrusion 39 slides on the circumferential surface 131 of the drive shaft 13 in an opposite direction to the arrow R. At this time, the second protrusion 39 returns the refrigerant and the lubricating oil to the space between the sliding contact portion 351 of the lip ring 35 and the circumferential surface 131 of the drive shaft 13 towards the crank chamber 121. That is, the second protrusion 39 prevents the lubricating oil and the refrigerant dissolved in the lubricating oil from leaking into the space S side. Thus, the second protrusion 39 prevents pressure in the space S between the lip ring 35 made of rubber functioning as a first lip ring and the lip ring 36 made of resin functioning as a second lip ring from increasing. In this case, the above maintained pressure prevents the lip ring 36 made of resin from deforming. In addition, wear and tear of the sliding contact portion 361 are substantially reduced.

As described above, wear and tear of the sliding contact portion 351 of the lip ring 35 made of rubber and the sliding contact portion 361 of the lip ring 36 made of resin are substantially reduced Also, the lip ring 36 made of resin is prevented from being deformed. Accordingly, the life of the lip seal 30 is extended.

(2) Each of the first protrusions 38 and each of the second protrusions 39 are next to each other and are respectively continuously connected to each other. That is, each of the first protrusions 38 and each of the second protrusions 39 are respectively continuously connected to each other to form an annular ring about the sliding contact portion 351. This continuous constitution is effective to prevent the refrigerant and the lubricating oil in the space between the sliding contact portion 351 and the circumferential surface 131 from leaking (3) The lip ring 35 made of rubber, which is excellent to create a seal, primarily prevents the refrigerant in the crank chamber 121 from leaking. If the lip ring 35 made of rubber is not satisfactorily lubricated, the lip ring 35 made of rubber is abnormally or prematurely worn. When the lip ring 35 made of rubber is applied to the first lip ring having the first protrusion 38, the first lip is excellent in creating a seal and is suitable to extend the life of the lip seal 30 which is a shaft seal.

(4) If a single pair of the first protrusion 38 and the second protrusion 39 forms an annular ring about the axis 132, the sliding contact portion 351 of the lip ring 35 made of rubber requires great width W in a direction of the axis 132 which is shown in FIG. 2. As the width W of the sliding contact portion 351 is increased, resistance of the sliding contact portion 351 against the drive shaft 13 also increases. The increased resistance is not desirable. The first protrusion 38 and the second protrusion 39 respectively do not form an annular ring about the axis 132 of the drive shaft 13 and are arranged about the axis 132 in rows. In this constitution, the width W of the sliding contact portion 351 does not require to be increased.

(5) As refrigerant, carbon dioxide has much higher-pressure than freon series. If the sliding contact portion 351 of the lip ring 35 made of rubber is not satisfactorily lubricated, sealing performance of the lip ring 35 is deteriorated at an early stage. If carbon dioxide leaks into the space S, pressure in the space S greatly increases. Thereby, the lip ring 36 made of resin tends to be deformed and the sliding contact portion 361 also tends to be easily worn. In the present invention, however, the sliding contact portion 351 of the lip ring 35 made of rubber is satisfactorily lubricated, and the lip seal 30 is also excellent in preventing the refrigerant and the lubricating oil from leaking into the space S. Accordingly, the lip seal 30 is suitably applied to the compressor in which carbon dioxide is used as refrigerant.

(6) While the drive shaft 13 is rotated, the pressure in the crank chamber 121 substantially changes in a wide range. When such pressure acts on the lip ring 35 made of rubbers the sliding contact portion 351 of the lip ring 35 made of rubber tends to be worn, especially if the sliding contact portion 351 is not satisfactorily lubricated. The lip seal 30 has the lip ring 35 made of rubber including the first protrusion 38 and the second protrusion 39. Therefore, the lip seal 30 is suitably applicable as a shaft seal in a variable displacement compressor.

Figures 4A, 4B:
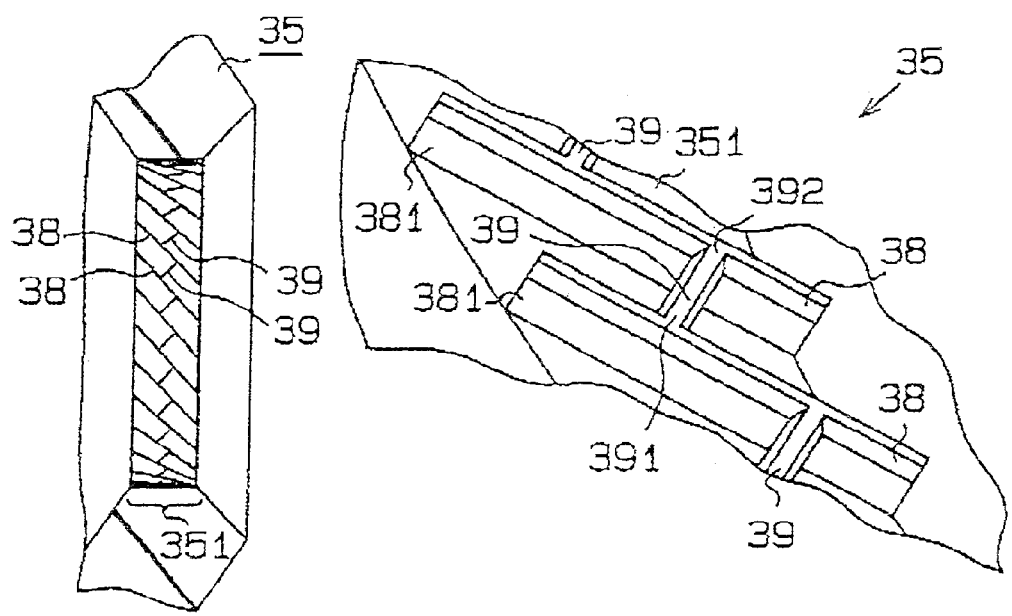
FIG. 4(a) is a partial enlarged cross-sectional side view illustrating a second embodiment of the shaft seal according to the present invention.
FIG. 4(b) is a partial enlarged perspective view illustrating the second preferred embodiment of the shaft seal according to the present invention.

A second preferred embodiment of the present invention will be described with reference to FIGS. 4(a) and 4(b). The same reference numerals of the first preferred embodiment are applied to substantially the same components in the second preferred embodiment. In the second preferred embodiment, the low-pressure side end 391 of the second protrusion 39 is connected to the first protrusion 38 except the low-pressure side end 381 and the other side end of the first protrusion 38. The same effects of the first preferred embodiment are obtained.

A third preferred embodiment of the present invention will be described with reference to FIGS. 5(a) and 5(b). The same reference numerals of the first preferred embodiment are applied to substantially the same components in the third preferred embodiment. In the third preferred embodiment, the high-pressure side end 392 of the second protrusion 39 is not connected to the first protrusion 38. The above described effects (1), (3), (4), (5) and (6) of the first preferred embodiment are substantially obtained.

A fourth preferred embodiment of the present invention will be described with reference to FIGS. 6(a) and 6(b). The same reference numerals of the first preferred embodiment are applied to substantially the same components in the fourth preferred embodiment. In the fourth preferred embodiment, the low-pressure side end 391 of the second protrusion 39 and the low-pressure side end 381 of the first protrusion 38 are at an acute angle. The same effects of the first preferred embodiment are substantially obtained.

Figure 7A:
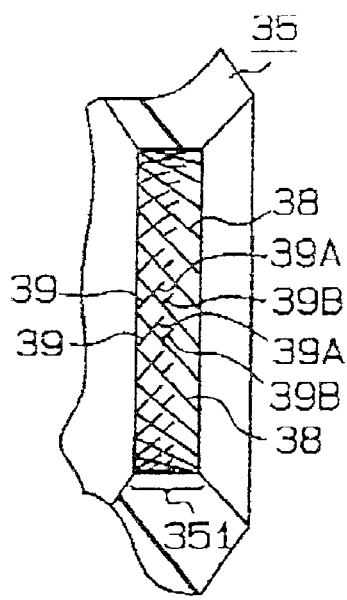
FIG. 7(a) is a partial enlarged cross-sectional side view illustrating a fifth embodiment of the shaft seal according to the present invention.
Figure 7B:
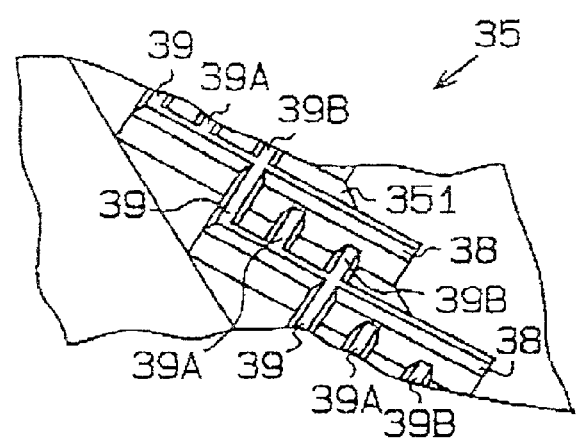
FIG. 7(b) is a partial enlarged perspective view illustrating the fifth preferred embodiment of the shaft seal according to the present invention.

A fifth preferred embodiment of the present invention will be described with reference to FIGS. 7(a) and 7(b). The same reference numerals of the first preferred embodiment are applied to substantially the same components in the fifth preferred embodiment. In the fifth preferred embodiment, a plurality of second protrusions 39, 39A and 39B are provided with the first protrusion 38. The same effects of the first preferred embodiment are substantially obtained.

Figure 8:
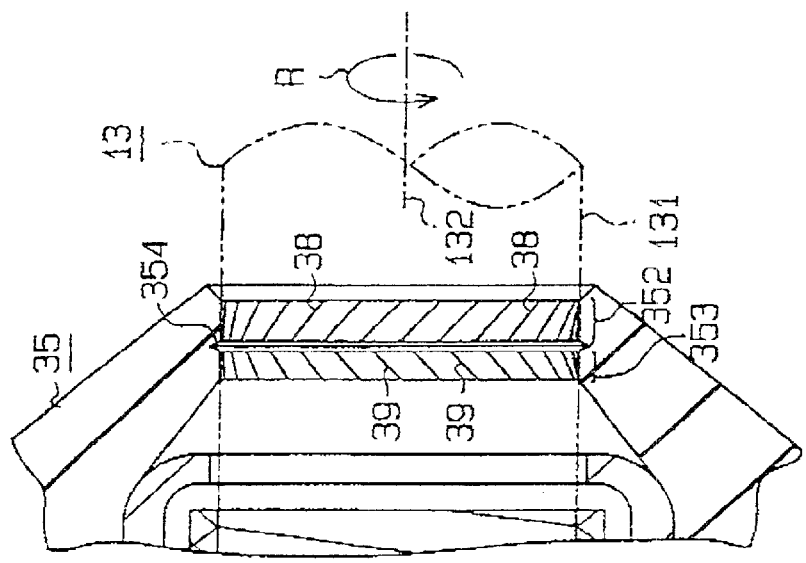
FIG. 8 is a partial enlarged cross-sectional side view illustrating a sixth embodiment of the shaft seal according to the present invention.

A sixth preferred embodiment of the present invention will be described with reference to FIG. 8 The same reference numerals of the first preferred embodiment are applied to substantially the same components in the sixth preferred embodiment. In the sixth preferred embodiment, a pair of sliding contact portions 352 and 353 is in the shape of a circumferential surface, and a plurality of the pairs is placed in rows. The sliding contact portions 352 and 353 are separated through an annular recess 354. The first protrusions 38 are formed on the sliding contact portion 352, and the second protrusions 39 are formed on the sliding contact portion 353.

In the embodiment, the above described effects (1), (3), (4), (5) and (6) of the first preferred embodiment are substantially obtained. In addition, the annular recess 354 accumulates oil, thereby lubricating the sliding contact portions 352 and 353 more satisfactorily than the sliding contact portion 351 in the first embodiment.

Figure 9:
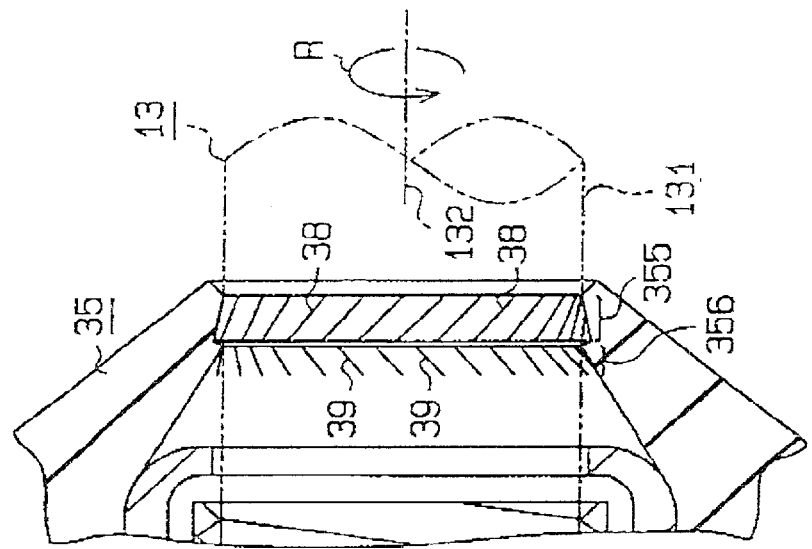
FIG. 9 is a partial enlarged cross-sectional side view illustrating a seventh embodiment of the shaft seal according to the present invention.

A seventh preferred embodiment of the present invention will be described with reference to FIG. 9. The same reference numerals of the sixth preferred embodiment are applied to substantially the same components in the seventh preferred embodiment. A pair of sliding contact portions 355 and 356 is in a tapering shape, and a plurality of the pairs is placed in rows on the lip ring 35 made of rubber to have steps. The first protrusions 38 are formed on the sliding contact portion 355, and the second protrusions 39 are formed on the sliding contact portion 356. In the seventh preferred embodiment, the similar effects of the sixth preferred embodiment are obtained.

Figure 10:
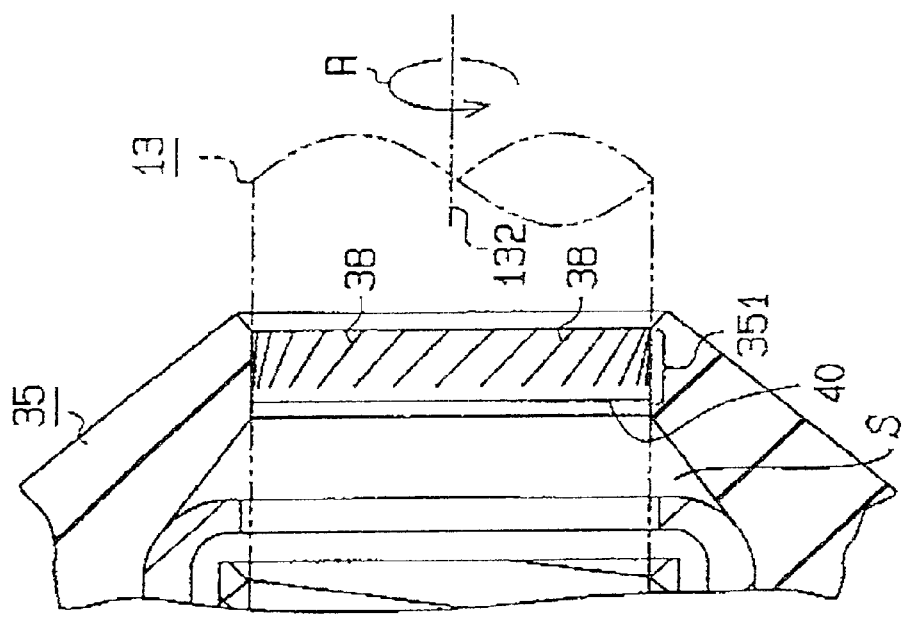
FIG. 10 is a partial enlarged cross-sectional side view illustrating an eighth embodiment of the shaft seal according to the present invention.

A eighth preferred embodiment of the present invention will be described with reference to FIG. 10 The same reference numerals of the first preferred embodiment are applied to substantially the same components in the eighth preferred embodiment. A plurality of the first protrusions 38 and a single annular second protrusion 40 for preventing the refrigerant and the lubricating oil from leaking are formed on the lip ring 35 made of rubber. The second protrusion 40 prevents the refrigerant and the lubricating oil from leaking to the space S side while the second protrusion 40 doesn't return the refrigerant and the lubricating oil to the crank chamber side 121.

In the present invention, the following alternative embodiments are also practiced.

Figure 11A:
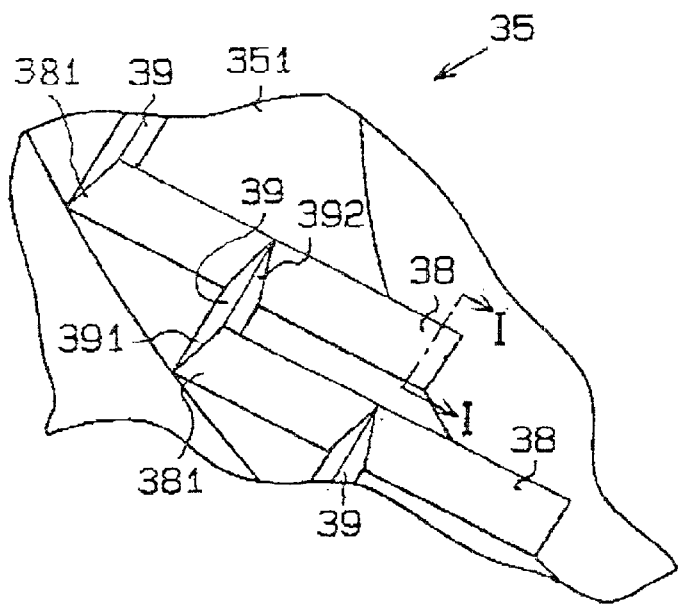
FIG. 11(a) is a partial enlarged perspective view illustrating one of the embodiments of the shaft seal according to the present invention.
Figure 11B:
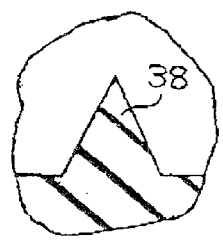
FIG. 11(b) is an enlarged cross-sectional view as seen from line I—I in FIG. 11 (a)
Figure 12A:
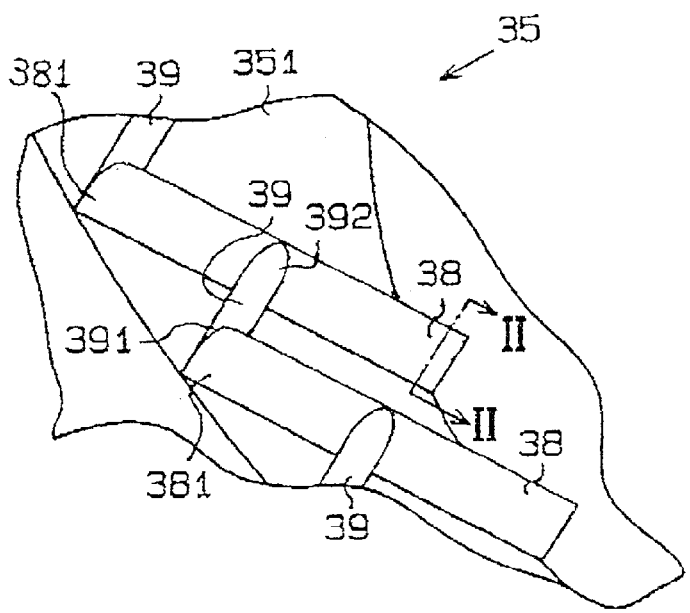
FIG. 12(a) is a partial enlarged perspective view illustrating one of the embodiments of the shaft seal according to the present invention.
Figure 12B:
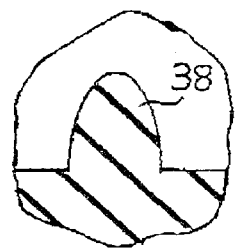
FIG. 12(b) is an enlarged cross-sectional view as seen from line II—II in FIG. 12(a).

Firstly, a first protrusion for guiding lubricating oil and a second protrusion for preventing the lubricating oil from leaking have different height. Secondly, the present invention is applied to a shaft seal to prevent refrigerant in a suction pressure area inside a compressor from leaking along a drive shaft. Thirdly, the present invention is applied to a shaft seal to prevent fluid from leaking along a rotary shaft other than the rotary shaft for a compressor. Fourthly, as shown in FIGS. 11(a) and 11(b), a first protrusion for guiding fluid and a second protrusion for preventing the fluid from leaking have a triangle cross-section. Fifthly, as shown in FIGS. 12(a) and 12(b), a first protrusion for guiding fluid and a second protrusion for preventing the fluid from leaking have a curved surface.

As described above, in the present invention, the sliding contact portion of the first lip ring against the circumferential surface of the rotary shaft has the first protrusion for guiding fluid and the second protrusion for preventing the fluid from leaking. Accordingly, the shaft seal is used for extended time for improving reliability.

The present examples and preferred embodiments are to be considered as illustrative and not restrictive and the invention is not to be limited to the details given herein but may be modified within the scope of the appended claims.

What is claimed is:

1. A lip ring for sealing a rotary shaft surface to prevent fluid from moving between a high-pressure area and a low-pressure area, the rotary shaft having a rotary axis and extending between the high-pressure area and the low-pressure area, comprising:

a ring surface located around the rotary shaft;

a plurality of first portions formed on the ring surface to slidably contact the rotary shaft surface, said first portions being placed at a first predetermined angle with respect to the rotary axis, wherein said first portions guide the fluid towards a space between the ring surface and the rotary shaft surface as the rotary shaft is rotated; and a plurality of second portions formed on the ring surface at a second predetermined angle with respect to the rotary axis, wherein said second portions prevent the fluid in the space from leaking into the low-pressure area.

2. The lip ring according to claim 1 wherein said first portions are first protrusions, said second portions being second protrusions.

3. The lip ring according to claim 2 wherein said second protrusions return the fluid in the space toward the high-pressure area as the rotary shaft is rotated, whereby said first protrusions and said second protrusions hold the fluid in the space.

4. The lip ring according to claim 3 wherein each of said second protrusions is placed near at least one of said first protrusions.

5. The lip ring according to claim 4 wherein said first protrusions are inclined with respect to a rotational direction of the rotary shaft on the rotary shaft surface so as to guide the fluid in the direction from the high-pressure area towards the low-pressure area, said second protrusions being inclined with respect to the rotational direction of the rotary shaft on the rotary shaft surface so as to guide the fluid in the direction towards the high-pressure area, said first protrusions and said second protrusions forming an annular shape around the rotary shaft together.

6. The lip ring according to claim 4 wherein each of said second protrusions is connected to at lease one of said first protrusions.

7. The lip ring according to claim 4 wherein each of said first protrusions and corresponding to at lease one of said second protrusions are at a substantially right angle with each other.

8. The lip ring according to claim 4 wherein each of said first protrusions and one of said second protrusions are at a predetermined acute angle.

9. The lip ring according to claim 4 wherein said first protrusions have a predetermined distance therebetween.

10. A shaft seal for sealing a rotary shaft surface to prevent fluid from moving between a high-pressure area and a low-pressure area, the rotary shaft having a rotary axis and extending between the high-pressure area and the low-pressure area, said shaft seal comprising:

a first lip ring fitted on the side of the high-pressure area of the rotary shaft further comprising;
a ring surface located around the rotary shaft,
a plurality of first portions formed on the ring surface to slidably contact the rotary shaft surface, the first portions being placed at a first predetermined angle with respect to the rotary axis, wherein the first portions guide the fluid towards a space between the ring surface and the rotary shaft surface as the rotary shaft is rotated,
a plurality of second portions formed on the ring surface at a second predetermined angle with respect to the rotary axis, wherein the second portions prevent the fluid in the space from leaking into the low-pressure area; and a second lip ring fitted on the side of the low-pressure area of the rotary shaft so that leakage of the fluid along the rotary shaft surface is prevented.

11. The shaft seal according to claim 10 wherein the first portions are first protrusions, the second portions being second protrusions.

12. The shaft seal according to claim 11 wherein the second protrusions return the fluid in the space toward the high-pressure area as the rotary shaft is rotated, whereby the first protrusions and the second protrusions hold the fluid in the space.

13. The shaft seal according to claim 10 wherein each of said second protrusions is placed near at least one of said first protrusions.

14. The shaft seal according to claim 13 wherein said first protrusions are inclined with respect to a rotational direction of the rotary shaft on the rotary shaft surface so as to guide the fluid in the direction from the high-pressure area towards the low-pressure area, said second protrusions being inclined with respect to the rotational direction of the rotary shaft on the rotary shaft surface so as to guide the fluid in the direction towards the high-pressure area, said first protrusions and said second protrusions forming an annular shape around the rotary shaft together.

15. The shaft seal according to claim 13 wherein each of said second protrusions is connected to at least one of said first protrusions.

16. The shaft seal according to claim 13 wherein the first protrusions have a predetermined distance therebetween.

17. The shaft seal according to claim 10 wherein the first lip ring is made of rubber, the second lip ring being made of resin.

18. A compressor comprising:
a housing;
a drive shaft rotatably supported in said housing, said drive shaft having a rotary axis;
a cylinder block connected to said housing having a plurality of cylinder bores, said housing and said cylinder block forming a crank chamber and a suction chamber;
a piston disposed in each of the cylinder bores for compressing refrigerant;
a cam mechanism for converting rotation of said drive shaft to reciprocating movement of said piston;
a shaft seal for sealing a surface of said drive shaft to prevent the refrigerant from moving between a high-pressure area and a low-pressure area, the surface of said drive shaft defining a drive shaft surface, said drive shaft extending between the high-pressure area and the low-pressure area, said shaft seal further comprising;
a first lip ring fitted on the side of the high-pressure area of said drive shaft further comprising,
a ring surface located around said drive shaft, the lip ring having a ring surface,
a plurality of first portions formed on the ring surface to slidably contact the drive shaft surface, the first portions being placed at a first predetermined angle with respect to the rotary axis, wherein the first portions guide the refrigerant towards a space between the ring surface and the drive shaft surface as said drive shaft is rotated; and
a plurality of second portions formed on the ring surface at
a second predetermined angle with respect to the rotary axis, wherein the second portions prevent the refrigerant in the space from leaking into the low-pressure area; and
second lip ring fitted on the side of the low-pressure area of said drive shaft so that leakage of the refrigerant along the drive shaft surface is prevented.

19. The compressor according to claim 18 further comprising:

a capacity control mechanism located in said housing having a cam plate in the crank chamber for varying discharge capacity by controlling an inclination of the cam plate; and a control valve mechanism in said housing for controlling control pressure in the crank chamber, wherein the high-pressure area is the crank chamber.

20. The compressor according to claim 18 wherein the first portions are first protrusions, the second portions being second protrusions.

21. The compressor according to claim 20 wherein the second protrusions return the refrigerant in the space toward the high-pressure area as said drive shaft is rotated, whereby the first protrusions and the second protrusions hold the refrigerant in the space.

22. The compressor according to claim 18 wherein the refrigerant is carbon dioxide.

23. A lip ring for sealing a rotary shaft surface to prevent fluid from moving between a high-pressure area and a low-pressure area, the rotary shaft having a rotary axis and extending between the high-pressure area and the low-pressure area, comprising:

a ring surface located around the rotary shaft; and a plurality of protrusions formed on the ring surface to slidably contact the rotary shaft surface, wherein a length between said protrusions is substantially larger than a width of each of said protrusions, each of said protrusions forming an opening to the high-pressure area and a closure to the low-pressure area, whereby said protrusions receive the fluid in a space between the ring surface and the rotary shaft surface.

\* \* \* \* \*